UNITED STATES PATENT OFFICE.

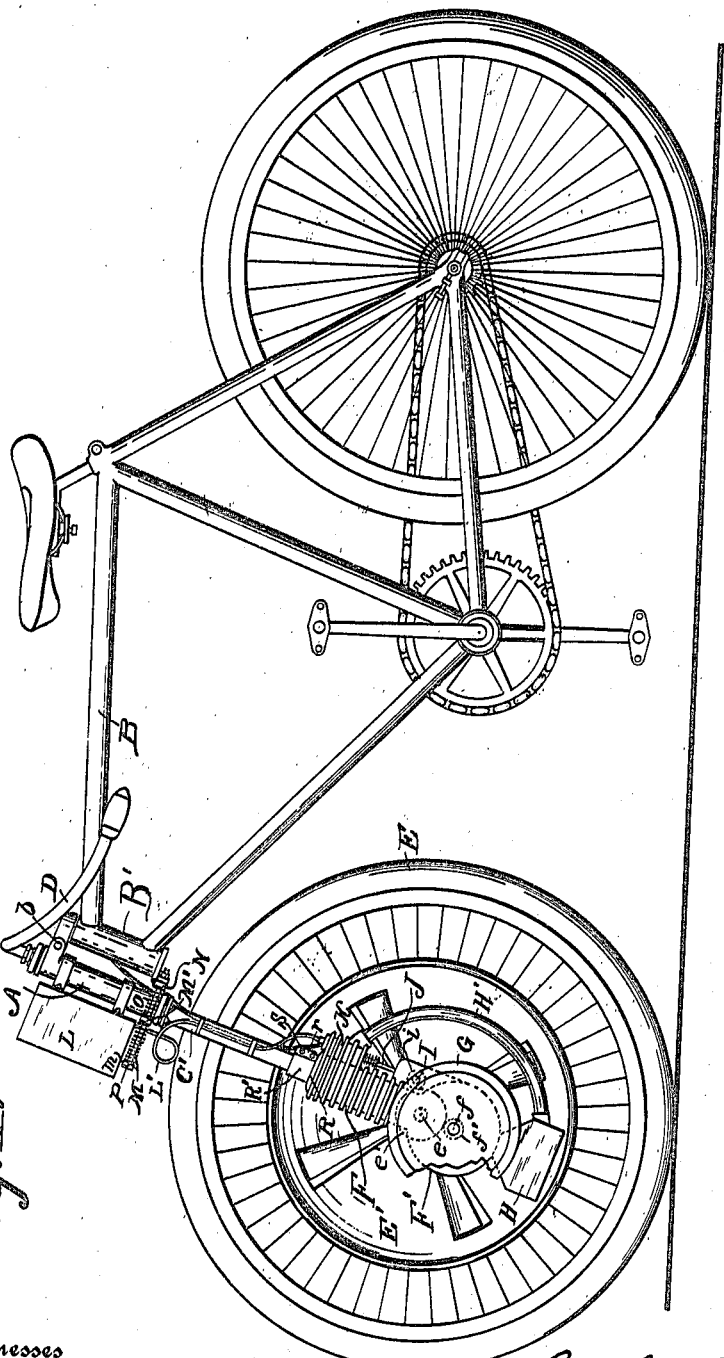

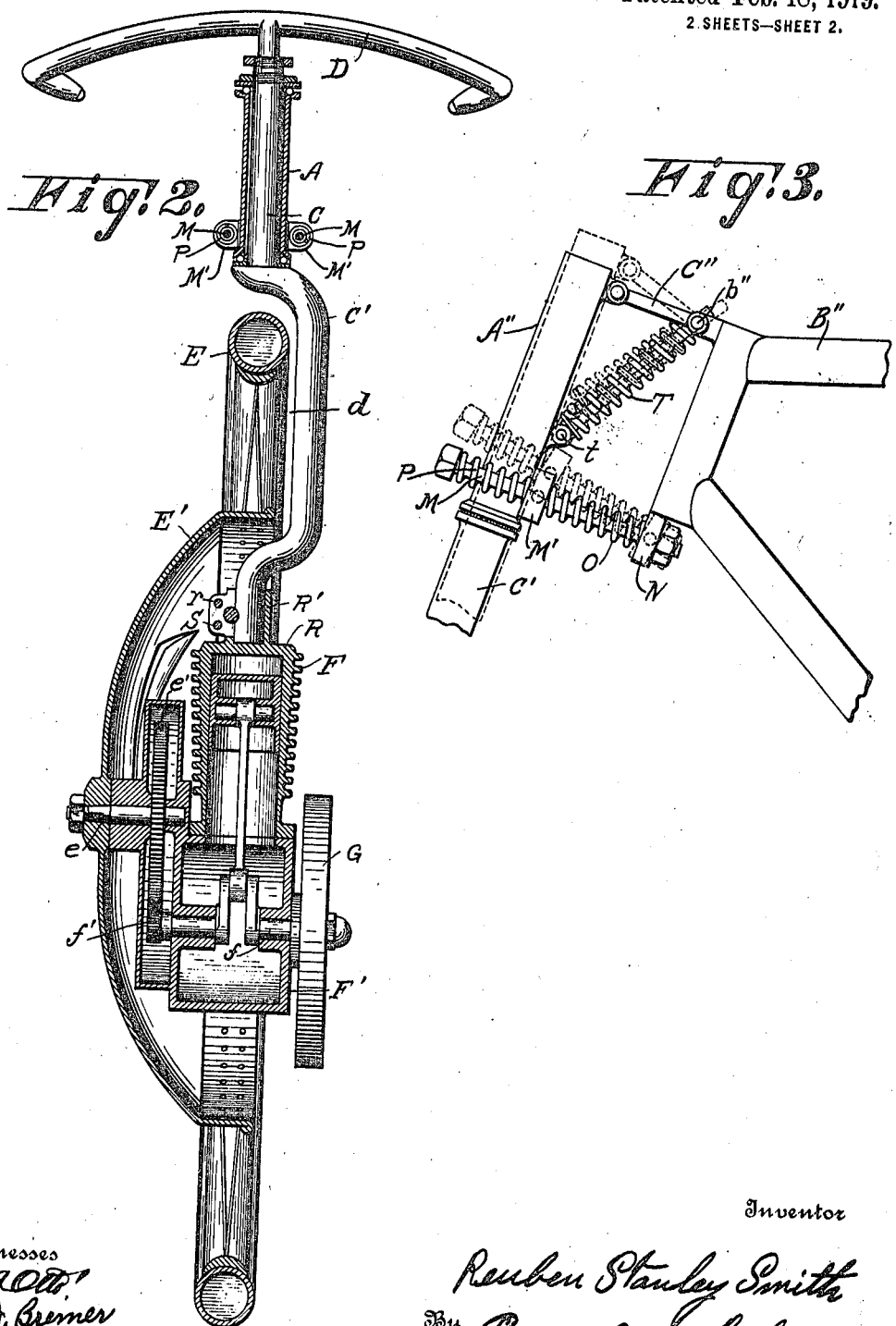

REUBEN STANLEY SMITH, OF MILWAUKEE, WISCONSIN, ASSIGNOR, BY MESNE ASSIGNMENTS, TO A. O. SMITH CORPORATION, OF MILWAUKEE, WISCONSIN, A CORPORATION OF NEW YORK.

STEERING TRACTOR UNIT.

1,295,092.  Specification of Letters Patent.  Patented Feb. 18, 1919.

Application filed April 26, 1915. Serial No. 23,961.

*To all whom it may concern:*

Be it known that I, REUBEN STANLEY SMITH, a citizen of the United States, residing at Milwaukee, county of Milwaukee, and State of Wisconsin, have invented new and useful Improvements in Steering Tractor Units, of which the following is a specification.

My invention relates to improvements in that class of steering tractor units, in which the weight of the motor is wholly supported by a single traction wheel.

The object of my invention is to provide a motor carrying traction wheel which is particularly adapted to be used as a steering wheel for a bicycle, all unnecessary weight being eliminated, the parts of the motor being nicely balanced and located as nearly as possible in the axial line of the steering head, or in a line which, if projected, will strike the roadway slightly in advance of the tread point; also to provide connecting members in which wheel vibrations, whether due to irregularities in the roadway or to the motor carried by the wheel, will be absorbed as far as possible without transmission to the vehicle frame and without permitting lateral swinging or wabbling movements; also to provide a form of structure in which the motor itself forms a part of the connecting arm, and in which the parts are relieved to a large extent from the strains of load inertia and in which all strains caused by vibration, inertia, or shock, are so modified as to be exerted along lines which do not intersect the point of connection with the main frame and are therefore readily converted into swinging movements, the force of which is absorbed by suitably arranged springs.

In the drawings—

Figure 1 is a side elevation of a bicycle embodying my invention.

Fig. 2 is a transverse sectional view drawn to a plane which includes the axis of the steering head.

Fig. 3 is a fragmentary view in side elevation, showing a modified form of steering head, with dotted lines indicating a relative upward movement of the head.

Like parts are identified by the same reference characters throughout the several views.

The steering head A is hinged to the main frame B at $b$, and the shank C of the steering arm C' is journaled in the head A in the usual manner. The steering arm also receives the shank of the handle bars D in the usual manner. Arm C' is not forked but is laterally arched at $d$ to clear the rim and tire of the wheel E, the latter being preferably formed with a sheet metal web E' sufficiently dished or centrally offset to receive a motor F in such position that the center of gravity of the entire structure, wheel and motor, will be substantially in the central plane of the rim and tire. The motor F illustrated in the drawings, is an engine of the internal combustion type, and the axis of its cylinder is substantially parallel with the axis of the steering head and either coincident with the axial line of the steering head projected or in close proximity thereto. The motor crank shaft $f$ crosses said line below the axle shaft $e$ of the traction wheel E, and motion is transmitted from the crank shaft to the axle $e$ through pinions $f'$ and gear wheel $e'$, fast on the crank shaft and axle shaft respectively. A fly wheel G is mounted upon the crank shaft $f$. Owing to the fact that the crank shaft is directly geared to the axle shaft, it is obvious that the fly wheel G will revolve in the opposite direction from that in which the traction wheel E revolves, thereby tending to neutralize gyroscopic effects. A muffling chamber H is preferably located in the same axial line, below the crank case F' from which it is supported, and a circularly curved exhaust pipe H' leads from the outlet port of the motor cylinder to the muffling chamber.

A cam shaft I is driven from gear wheel $e'$ through gear wheel $i$ mounted on the shaft I. The cams on said cam shaft actuate the valve rods J, valves of ordinary type being located in the valve chamber K. The cam shaft I, valve chamber K, the valve rods, etc., are illustrated as located on the rear side of the motor cylinder. The location of these parts is not essential as they are of comparatively light weight, but they are preferably located near the plane of the wheel, *i. e.* either in front or at the rear, of the cylinder.

The fuel tank L is preferably secured to the steering head A and communicates with the valve chamber K (or with a suitable carbureter, not shown), through a flexible pipe L'.

In place of the cushioned fork arms employed in ordinary motor cycles and in some bicycles to relieve the main frame from the shocks of road travel, I have provided the steering arm C' with a cross rod M, which passes through a projection M' on the arm C' immediately below the head A. This rod also passes through a projection N carried by the end member B' of the main frame B. A spring O is coiled about the rod M between the projections M' and N and another spring P is coiled about the rod M between the projection M' and a head m on the forward end of said rod. These springs O and P constitute cushions which resiliently oppose swinging movements of the head A and steering arm C' upon the hinge pin b, which connects the steering head A with the main frame B. But the springs allow sufficient movement to relieve the main frame from ordinary shocks of road travel. When the wheel E encounters a small obstruction over which it is carried both by momentum and traction, the wheel tends to swing forwardly and upwardly, as indicated by dotted lines in Fig. 3. This compresses spring P, which reacts as soon as the wheel passes the obstruction and thus restores the wheel to its normal relative position with reference to the main frame B. But when the traction wheel E encounters an obstruction of such character as to tend to materially check its forward movement, said wheel E may be forced rearwardly toward the main frame B to a limited extent, thus compressing spring O. This relieves the main frame B from stopping shock and also allows a slightly increased interval during which the traction of the wheel E may carry it over the obstruction.

It will be observed that the arm C' is clamped directly to the cap R of the engine cylinder. The cap R is provided with an upwardly projecting split socketed member R' having lateral clamping ears r through which a clamping bolt S passes. The lower extremity of the arm C' is adapted to enter the socketed member R' and is secured therein by the clamping bolt S, which preferably also engages in a recess formed in one side of the arm C'.

Referring to Fig. 3, it will be observed that the steering head A" is connected with main frame B" by a link C". The steering arm C' is the same as that illustrated in Figs. 1 and 2, and is provided with a cross rod M passing through projection M' on the steering arm and through projection N carried by the main frame B", said cross rod being provided with cushion springs O and P, like those above described with reference to Figs. 1 and 2. An additional coiled spring T is interposed between the pivotal axis b", which forms the connection between link C" and the upper front end of the main frame B". The lower end of the spring T seats against a shoulder t formed on the rear side of the head A". This construction allows relatively swinging movements of the head and main frame in a vertical plane, as indicated by dotted lines in Fig. 3. It will of course be understood that the apertures in the projections M' and N, through which the cross rod M passes, are so formed as to permit the required tilting movements of rod M.

While I have described my invention as including the use of an internal combustion motor, I do not wish to be understood as limiting the scope thereof to any specific form of motor nor to the specific details illustrated, the terms and expressions employed in this description and in the appended claims being used for the purpose of description and not of limitation. It is not my intention to exclude from the scope of my invention any mechanical equivalents for the parts and combinations of parts illustrated.

I claim—

1. In a bicycle, the combination with a steering wheel provided with a driving axle, of an internal combustion engine in driving connection with the axle, and a steering post rigidly connected with the upper end of the engine.

2. The combination with a vehicle frame, of an axially rotatable steering arm, a head in which said arm is journaled, hinged to the front end of the frame upon a transverse axis, a traction wheel connected in supporting relation to the arm and frame, and a motor connected with said arm, with its heavier elements in alinement along the axis of arm rotation.

3. The combination with a vehicle frame, of an axially rotatable steering arm, a head in which said arm is journaled, hinged to the front end of the frame upon a transverse axis, a traction wheel connected in supporting relation to the arm and frame, and a motor connected with said arm, with its heavier elements in alinement along the axis of arm rotation, together with means for resiliently limiting swinging movements of the arm with reference to the vehicle frame.

4. The combination with the main frame of a vehicle, of a steering head flexibly connected therewith and adapted for relative swinging movement in a vertical plane which includes the frame bars, a steering arm journaled in said head, a motor lineally connected with the steering arm, a traction wheel supporting the motor, and means for resiliently cushioning the swinging movements of the steering head and arm.

5. In a bicycle, the combination with a dished steering wheel, provided with a driving axle, of an internal combustion engine located within the dished portion of the wheel, and operatively connected to drive the axle and wheel, and a steering post rigidly connected with the cylinder, and arched about the wheel rim, the upper end of said steering post and the axis of the cylinder being in substantial alinement.

6. In a bicycle, the combination with a dished steering wheel, provided with a driving axle, of an internal combustion engine located within the dished portion of the wheel, with its crank parallel to the driving axle, and below the same, gear connections between the crank and the driving axle, and a steering post rigidly connected with the engine cylinder, the axis of the cylinder being substantially in line with the steering axis, and substantially in the plane of the wheel rim.

7. A steering arm for traction wheels, in combination with an internal combustion engine cylinder secured to the lower end portion of the arm, with its axis substantially parallel with the axial line of the arm, said arm having an offset portion at an intermediate point adapted to partially encircle the rim and tire of a wheel.

8. A steering arm for traction wheels, in combination with an internal combustion engine cylinder and a crank case, all lineally connected end to end in rigid alinement along the axis of the steering arm, a transversely mounted axle shaft connected with said lineally connected members, means for driving the same under power developed in said cylinder, and a supporting traction wheel connected with said shaft.

9. The combination with a dished steering wheel provided with a stub axle projecting from the concave side thereof, a bearing member journaled on said axle, a single steering arm connected with the bearing member and arched over the rim of the wheel, a steering head beyond the rim of the wheel in which said arm is journaled, substantially in the central plane of the wheel.

10. The combination with a dished steering wheel, provided with a stub axle projecting from the concave side thereof, a bearing member journaled on said axle, a single steering arm connected with the bearing member, and arched about the rim of the wheel, a steering head beyond the rim of the wheel in which said arm is journaled, and a motor supported by said arm in driving relation to said axle.

11. The combination with a dished steering wheel, provided with a stub axle projecting from the concave side thereof, a bearing member journaled on said axle, a single steering arm connected with the bearing member, and projecting above the rim of the wheel, a steering head beyond the rim of the wheel in which said arm is journaled, and an internal combustion motor, having a cylinder and crank case disposed along the axis of the steering head with all parts thereof arranged at minimum distances from said axis, and its wall symmetrically disposed with reference thereto, whereby steering movements are facilitated.

12. A traction wheel consisting of a dished central portion adapted to partially house a motor, a plurality of fan blades formed integrally with said central portion and adapted to direct a cooling current of air across a motor housed thereby, a rim and tread portion, and a set of tension spokes adapted to support said rim and said central portion in driving relation, and a motor mounted within said dished central portion of the wheel and operatively connected to drive the same.

In testimony whereof I affix my signature in the presence of two witnesses.

REUBEN STANLEY SMITH.

Witnesses:
   LEVERETT C. WHEELER,
   IRMA D. BREMER.